Sept 10, 1957 C. E. WEBB 2,805,461
TUBULAR DRILL FOR PERFORATING CLAY PIPES
Filed Nov. 16, 1953

INVENTOR.
Cecil E. Webb.
BY Wood, Herron & Evans,
ATTORNEYS.

United States Patent Office 2,805,461
Patented Sept. 10, 1957

2,805,461

TUBULAR DRILL FOR PERFORATING CLAY PIPES

Cecil E. Webb, Cincinnati, Ohio, assignor to M. S. Bowne, trustee, Clearfield, Ky.

Application November 16, 1953, Serial No. 392,239

3 Claims. (Cl. 25—105)

This invention relates generally to the manufacture of clay drainage pipes which are perforated to allow liquids to drain through the pipe wall; more particularly, the invention is addressed to a tubular drill for perforating the pipe wall while it is in a plastic or semi-plastic condition.

Perforated clay tile drainage pipes of this character are utilized for a great many purposes, for example, as pipe lines which drain waste liquids into the soil and as lines which drain excess water from flat fields and farm lands. The pipes are furnished in sections, either with plain ends or with a bell or socket in one end which interfits the spigot end of an adjoining pipe section. The holes are formed in rows extending longitudinally along the pipe over an area slightly less than half the diameter of the pipe. The pipes are installed in the trench with the holes facing downwardly to prevent clogging after the trench is filled in.

The present drill is intended particularly for use in a perforating machine of the character disclosed in the copending application of Cecil E. Webb entitled "Clay Pipe Perforating Machine," Serial No. 387,647, which was filed on October 22, 1953. This machine is automatic in operation and is provided with multiple drill heads, each head having a row of motor driven spindles which rotate the drills collectively at a predetermined speed. Each drill head includes a power feed mechanism which reciprocates the head and feeds drills through the wall of the clay pipe at a lineal rate, which is correlated to the speed of rotation of the drill spindles. The drill spindles are each provided with a bore to receive an end of the drill and a driving pin which establishes a driving connection with the drill and which also confines the drill longitudinally in the bore of the spindle.

The clay pipes are fabricated from plastic clay, usually by an extrusion process, and after extrusion, but while still in a plastic or semi-plastic condition, the longitudinal rows of holes are drilled through the pipe wall along one side. One well known extrusion machine used in the clay pipe industry comprises a steam operated press which extrudes the clay cylinders at a rapid production rate and, if required, forms a socket at one end of the pipe as part of the operation. If a production line procedure is followed, the soft clay pipes issuing from the extruder may be placed in perpendicular position upon a conveyor for advancement directly to a finishing machine which trims and finishes their opposite ends; thereafter, the pipes are advanced to the perforating machine. In other instances, the pipes are advanced to the perforating machine as a separate manual operation after they are extruded and finished. After the perforating operation, the pipes are placed in a drying area where they are dried by exposure to warm air currents in preparation for firing and glazing.

The drill heads of the perforating machine are located in radial positions delineating a semi-circular throat arranged to receive the pipe in vertical position. The axes of the several rows of drills all radiate toward the central axis of the pipe when it is positioned in the throat, and each drill head is provided with a guide bar, which collectively with a back stop, locates the pipe in drilling position. The drill heads are reciprocated in unison in a rapid automatic manner at a lineal rate of speed which advances the leading end of each drill through the wall of the pipe while the drill completes approximately one and one half revolutions.

One of the primary objects of the invention has been to provide a tubular drill formed of light gauge sheet metal, which penetrates the plastic clay wall at high speed in cork screw fashion without requiring a mandrel or internal pipe wall backing and which produces holes which are clean-cut and free of burrs both at the internal and external edges of the hole.

By eliminating the need for mandrels, the present drill contributes directly to the practicability of the perforating machine. Instead of placing each pipe upon a mandrel or fixture, perforating it, then removing the perforated pipe, the pipes are simply advanced in random fashion to the machine where they are perforated quickly with practically no extra handling.

Each drill is tubular and has a generally spiral leading end; the rate of lineal advancement of the tubular drill through the wall is less than the pulling effect induced by the rotation of its spiral leading end and this differential creates a tendency to pull the clay outwardly in cork screw fashion as the leading end penetrates the clay wall. The cork screw action removes the burr which would otherwise be formed around the internal edge of the hole as the end portion of the drill penetrates the unsupported internal wall surface. Accordingly, the drill severs a cylindrical clay plug from the wall during its advancement and extracts the severed plug as it retracts, leaving the hole clean and free of burrs at both ends.

Another object of the invention has been to provide a tubular drill formed of a relatively thin sheet metal stamping which requires no cutting edge in the usual sense, but which instead, utilizes the spiral leading end which is formed in a blanking and forming operation. Therefore, the drill requires no sharpening other than the blanking and forming operations which are incidental to its manufacture.

The clay pipe wall, although in plastic condition, has by its very nature, an abrasive action upon any drill or punch which may be employed in perforating; hence the drills become worn in a relatively short time and ordinarily must be resharpened or reconditioned frequently. According to the present tubular drill structure, the drills are produced at a high production rate and at a sufficiently low cost that they may economically be discarded and replaced after they become worn after prolonged service.

Further objects of the invention have been to provide a drill having a flexible chucking head which is conveniently mounted and demounted relative to the bore of the drill spindle; also to provide means for adjusting the drill lengthwise relative to the spindle and thereby to adapt the perforating machine to various pipe wall thicknesses in a simple manner.

In order to facilitate mounting and demounting of the drills and to provide the length adjustment, the flexible sheet metal chucking head of the drill includes a longitudinal slot and a series of lateral notches opening into the slot along one side. The chucking head has a diameter slightly greater than the bore of the drill spindle and by virtue of its longitudinal slot, it is capable of being compressed slightly with the fingers and inserted into the bore of the shaft to provide an expansion fit when released.

The driving connection is provided by the radial pin in the bore of the drill spindle, as noted earlier, which selectively engages one of the several notches, depending upon the longitudinal position of the drill. Thus, the drill is adjusted to the desired length by shifting it longitudinally then rotating it relative to the spindle to engage the selected notch. The arrangement locks the drill in its longitudinal adjustment and also provides the driving connection in a single operation.

When the drills become worn they are quickly demounted from the head simply by compressing the cylindrical chucking portion slightly, rotating the drill in a direction to disengage the notch, and then withdrawing the drill from the bore. Although the several heads each carry multiple drills, the rapid mounting and demounting of the drills allows the drills to be replaced quickly without shutting down the perforating machine for any substantial period of time.

Various other features and advantages of the invention will be more fully apparent to those skilled in the art from the following detailed description made with reference to the accompanying drawings.

Figure 2:
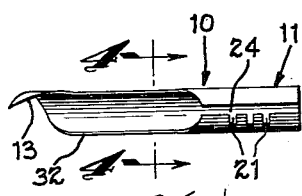
Figure 2 is a view of the tubular drill after the forming operation.
Figure 5:
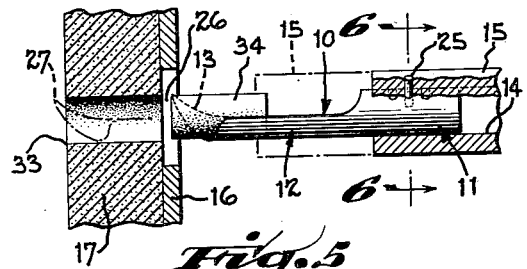
Figure 5 is a fragmentary sectional view showing the drill mounted in the spindle of a drill head, illustrating the relationship of the drill to the clay wall of a pipe located in drilling position against the guide bar of the perforating machine.
Figure 3:
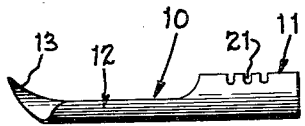
Figure 3 is a view taken at right angles to Figure 2, further detailing the drill structure.

Referring to Figures 2 and 3 of the drawings, the tubular drill, as indicated generally at 10, is formed from relatively thin gauge sheet metal and includes a cylindrical chucking head 11, an elongated shank portion 12, and a generally spiral leading end portion 13. As shown in Figure 5, the chucking head is telescopically mounted in the internal bore 14 of a rotatable drill spindle 15 which projects from one of the drill heads (not shown) of the perforating machine, as disclosed in the above noted copending application.

As indicated above, the perforating machine includes guide bars 16, one for each drill head, which collectively form a semi-circular receiving throat which confines the perpendicular length of pipe in drilling position with respect to the leading ends of the drills. The multiple drill heads are arranged radially with respect to one another and axes of their drills all radiate toward a common center which corresponds to the center axis of the pipe when it is positioned in the receiving throat. Thus as shown in Figure 5, the ends of all of the drills, when in retracted position, reside in corresponding positions adjacent the external surface of the pipe wall 17 in position to penetrate the wall when advanced to the position shown in broken lines.

Figure 1:
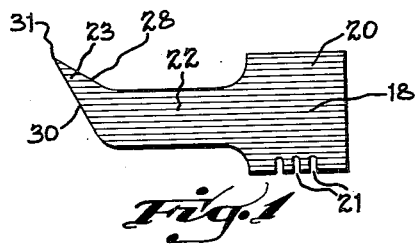
Figure 1 is a plan view of the sheet metal blank of the drill before the forming or curling operation.

Described in detail, the drill is fabricated by a simple blanking and forming operation from light gauge sheet metal, preferably spring steel approximately .020" in thickness. The blank, indicated at 18 (Figure 1) is formed by a suitable punch and die set in the conventional manner upon a hand or power operated press. The spring steel is blanked and formed in soft condition and is hardened after forming; for example, it may be annealed for working, then hardened and drawn after blanking and forming. In general, the blank comprises an enlarged head portion 20 having a series of notches 21 formed along one side edge, an elongated shank portion 22, and a lateral spur portion 23. The blank is formed to its cylindrical shape by forming or curling dies which are well known in the sheet metal industry and which form the blank to its final cylindrical shape within close tolerance limits in one or more stages of operation.

As best shown in Figure 2, the diameter of the cylindrical chucking head 11 is such that the side edges of the blank head portion 20, when rolled to cylindrical shape, are spaced to provide the longitudinal slot 24 with the lateral notches 21 opening into the slot along one side. The diameter of bore 14 of the drill spindle is slightly smaller than the diameter of the chucking head 11 to provide an expansion fit around the head. Upon inserting chucking head 11 into the drill spindle, the head, being formed of resilient spring steel, is compressed slightly between the fingers and upon being released, expands outwardly into pressure engagement with the surface of bore 14.

Figure 6:
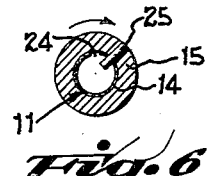
Figure 6 is a sectional view taken along line 6—6, Figure 5, detailing the engagement of the driving pin of the spindle with the drill.

To provide a driving connection with the chucking head, the drill spindle is provided with a driving pin 25 which projects radially into the bore of the spindle as shown in Figure 6. When inserting the chucking head into the bore, the longitudinal slot 24 is lined up with the pin, the drill is then slipped into the chuck for the required distance, then the drill is rotated relative to the spindle toward the left as viewed in Figure 6 to bring one of the notches 21 into keyed engagement with the pin. During the drilling operation, the spindle rotates to the right, as indicated by an arrow in Figure 6, thus tending to provide relative rotation between the drill and spindle in a direction to force the pin toward the closed end of the notch in which it is engaged. The notches thus cooperate with the pin to provide the driving connection from the spindle to the drill and also to provide the length adjustment for the drill as explained later in detail.

The clay pipes are furnished in several standard diameters and the thickness of the pipe wall, indicated at 17 in Figure 5, varies with the diameter of the pipe and other factors. However, as indicated in broken lines, the stroke of the drill head and drill relative to the guide bars 16 is fixed; hence to accommodate the several wall thicknesses, the length of the drill which projects from the spindle, must be varied to match the thickness of the pipe walls. For this purpose, the chucking head 11 is provided with the set of notches 21, in the present disclosure three in number, which are selectively keyed with the driving pin 25 to provide the effective drill length.

In Figure 5, the pipe wall 17 is of medium thickness and the drill is shown in an intermediate length adjustment, the middle of the three notches being keyed to the driving pin. In this adjustment, the leading end of the drill, when in retracted position, resides in spaced relationship to the external surface of the pipe as indicated at 26. When the drill head reciprocates to its extended position, as indicated in broken lines, the leading end of the drill penetrates the pipe wall and protrudes slightly beyond its internal surface as indicated in broken lines, at 27.

Figure 8:
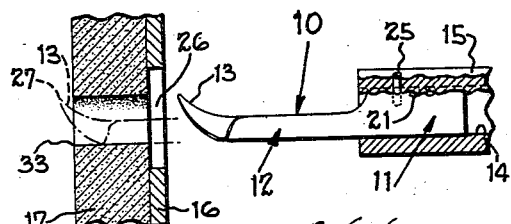
Figure 8 is a view similar to Figure 5, showing the drill adjusted to a position to accommodate a clay wall of reduced thickness.

The relationship of the leading end to the internal wall surface is rather critical since the spiral leading edge of the drill is effective to remove the burr which would otherwise be formed around the inner edge of the hole, as explained later in detail. Therefore, the purpose of the notches 21 is to provide approximately the same degree of protrusion of the drill when the perforating machine is set up for a pipe having a different wall thickness. As shown in Figure 8, the machine is set up for a pipe having a thinner wall 17, and in this case, the forward of the three notches is engaged upon the driving pin. In this adjustment, the leading end of the retracted drill is spaced at at 26 a greater distance from the external wall surface. Since the stroke of the spindle relative to the guide bar is constant, the leading end portion of the drill, when advanced, protrudes approximately the same distance 27 from the internal wall surface as in the case of the thicker wall. To accommodate a wall thickness greater than that shown in Figure 5, the rear-most notch of the group is engaged upon the pin such that very little clearance 26 exists between the end of the drill and wall surface.

Figure 4:
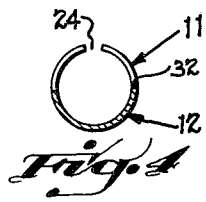
Figure 4 is an enlarged sectional view taken along line 4—4, Figure 2.

Referring to Figure 4, it will be seen that the shank 12 of the drill is semi-circular in cross section and that the spur 23 at the end of the shank is curled to the same radius as the shank and chucking head. Although the spur, in flat condition, is delineated by straight edges 28 and 30 which converge outwardly toward the point 31, the two edges become spiral surfaces when the spur is curled, the edge 28 forming the spiral leading edge. As viewed from the end (Figure 7), the spur rises upwardly to a point in an arc approximately 45° above the straight side edge 32 of the shank and thus overhangs the semi-circular shank.

The drill is rotated in the direction of its point 31, such that the spiral leading edge 28 tends to advance in cork screw fashion through the clay wall. As explained earlier, the rate of rotation and lineal advancement are coordinated to provide approximately one and one half complete revolutions of the drill as it advances through the clay wall. Thus a given point on the periphery of the drill moves in a spiral path which is the resultant of the lineal advancement and rotary motion. However, the lead of the spiral edge 28 is greater than the developed spiral path; consequently, the leading edge exerts a constant pulling action during penetration of the clay wall. As a practical matter, the spiral leading edge, combined with the rapid drill feed and speed, provides an exceptionally clean-cut hole which is free of distortion and burrs.

In a conventional drilling operation in which the plastic clay wall is left unsupported by a mandrel or similar backing, the passage of the drill or perforating punch leaves an undesirable burr around the hole on the internal surface of the pipe wall. For this reason it is conventional practice to utilize a backing surface which lies in contact with the internal wall surface, the drill or punch being run through the wall and up against the backing surface. Although this procedure eliminates burring, it slows down production considerably since each section of pipe must be placed upon the backing fixture before the pipe is perforated and must be removed after the operation is completed.

As noted earlier, the present drill, by operation of its spiral leading edge 28, has the effect of removing any burr which may tend to form around the internal edge 33 of the hole. As the drill point 31 penetrates the internal wall surface, the advancing edge 28, which is angular to the wall surface, has a tendency to plane the clay into the hole as it is sheared. It has been demonstrated that this action is most effective near the end portion of the spiral spur and it is for this reason that drill point penetration is limited to that indicated at 27 in Figure 5. In other words, as viewed from the side in Figure 3, the leading edge curves with a gradually diminishing slope downwardly from the point 31 toward the shank of the drill; consequently, the pulling effect upon the burr becomes less, as penetration and projection of the drill point beyond the internal wall surface increases.

Figure 7:
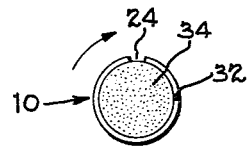
Figure 7 is an enlarged end view showing the position of a clay plug within the drill after the drill penetrates and retracts from the clay wall.

After the drill penetrates the wall, it is immediately retracted and the clay plug 34, which is severed from the wall, adheres to the inner surface of the shank. The forward end portion of the plug is confined within the spiral spur and semi-circular shank, as indicated in Figure 7. The clay plug remains in this position until the drill is fully withdrawn, whereupon the rapid rotation of the drill is effective to dislodge and forcibly throw off the plug. Observation of the drilling operation indicates that the plug is usually dislodged as soon as the drill retracts; however, even if an occasional plug adheres to the drill, it offers no interference and is simply forced axially along the shank and dislodged during the next drilling operation.

The present drill contributes directly to the production speed and work quality since the drill rapidly produces clean-cut holes which are free of burrs. The drill requires no sharpening, since the spiral spur, which is created as an incident to the sheet metal forming operation, provides the cutting edge; moreover they are low in cost, and upon being worn, economically may be discarded and replaced. Although the perforating machine has multiple drill spindles, the keyed expansion fit allows the drills to be replaced very conveniently without shutting down the machine for any appreciable period of time.

Having described my invention I claim:

1. A tubular drill formed of resilient sheet metal adapted to be mounted in the bore of a rotating drill spindle, said bore having a driving element projecting radially from the surface thereof, said tubular drill being advanced and retracted axially by said rotating spindle through the unsupported wall of a plastic clay pipe to perforate the same, said drill comprising a cylindrical chucking sleeve having an open longitudinal slot extending from one end to the opposite end thereof, said slot imparting diametrical flexibility to the sleeve, said sleeve interfitting the cylindrical bore of the spindle upon being compressed diametrically, whereby the sleeve provides an expansion fit within said bore, said longitudinal slot having a driving notch extending laterally from one edge of said slot, the longitudinal slot providing clearance for the said driving element when the chucking sleeve is inserted into the bore of the spindle, said notch having a width interfitting said driving element and locking the chucking sleeve longitudinally within the bore of the spindle, a substantially semi-cylindrical shank extending from the outer end of the chucking sleeve, said shank having parallel side edges and having a pointed spur projecting outwardly from one of said side edges, said spur forming an endwise cylindrical continuation of the shank which extends through an arc toward the opposite side edge of the shank, said spur having an outer spiral edge extending from the point thereof rearwardly to one side edge of the shank, said spur having an inner spiral edge extending rearwardly from the point thereof to the opposite side edge of the shank, said inner spiral edge having a lead substantially greater than said outer spiral edge, said inner spiral edge comprising a leading edge which advances in cork screw fashion through the wall of the plastic clay pipe as the drill is rotated in the direction of said point and advanced axially through said wall.

2. A tubular drill formed of resilient sheet metal adapted to be mounted in the bore of a rotating drill spindle, said bore having a driving element projecting radially from the surface thereof, said tubular drill being advanced and retracted axially by said rotating spindle through the unsupported wall of a plastic clay pipe to perforate the same, said drill comprising a cylindrical chucking sleeve having an open longitudinal slot extending from one end to the opposite end thereof, said slot imparting diametrical flexibility to the sleeve, said sleeve interfitting the cylindrical bore of the spindle upon being compressed diametrically, whereby the sleeve provides an expansion fit within said bore, said longitudinal slot having a series of spaced notches extending laterally from one edge of said slot, the longitudinal slot providing clearance for the said driving element when the chucking sleeve is inserted into the bore of the spindle, said notches having a width interfitting said driving element and locking the chucking sleeve at a selective longitudinal position within the bore of the spindle, a substantially semi-cylindrical shank extending from the outer end of the chucking sleeve, said shank having parallel side edges and having a pointed spur projecting outwardly from one of said side edges, said spur forming an endwise cylindrical continuation of the shank which extends through an arc not greater than 90 degrees from one of said side edges toward the opposite side edge of the shank, said spur having an outer spiral edge extending from the point thereof rearwardly to one side edge of the shank, said spur having an inner spiral edge extending from the point thereof rearwardly to the opposite side edge of the shank, said inner spiral edge having a lead substantially greater than said outer spiral edge, said inner spiral edge comprising a leading edge which advances in cork screw fashion through the wall of the plastic clay pipe and severs a clay plug therefrom as the drill is rotated in the direction of said point and advanced axially therethrough, said spur confining the severed clay plug within the semi-cylindrical shank, thereby to withdraw the plug as the drill is retracted from the said wall.

3. A tubular drill formed of resilient sheet metal adapted to be mounted in the bore of a rotating drill spindle, said bore having a driving pin projecting radially from the surface thereof, said tubular drill being advanced and retracted axially by said rotating spindle through the unsupported wall of a plastic clay pipe to perforate the same, said drill comprising a cylindrical chucking sleeve having an open longitudinal slot extending from one end to the opposite end thereof, said slot imparting diametrical flexibility to the sleeve, said sleeve interfitting the cylindrical bore of the spindle upon being compressed diametrically, whereby the sleeve provides an expansion fit within said bore, said longitudinal slot having a series of spaced notches extending laterally from one edge thereof for a distance at least equal to the width of the slot, the longitudinal slot having a width greater than the width of said lateral notches and providing clearance for the driving pin when the chucking sleeve is inserted into the bore of the spindle, said notches having a width interfitting said driving pin and locking the chucking sleeve at a selective longitudinal position within the bore of the spindle, a substantially semi-cylindrical shank extending from the outer end of the chucking sleeve, said shank having a length at least equal to the length of said chucking sleeve and being concentric therewith, said shank having parallel side edges and having a pointed spur projecting outwardly from one of said side edges, said spur forming an endwise cylindrical continuation of the shank which extends through an arc not greater than 90 degrees from one side edge of the shank toward the opposite side edge, said spur having an outer spiral edge extending from the point thereof, rearwardly to one side edge of the shank, said spur having an inner spiral edge extending rearwardly from the point thereof to the opposite side edge of the shank, said inner spiral edge having a lead substantially greater than said outer spiral edge, said inner spiral edge having a length at least equal to the diameter of the shank, said inner spiral edge comprising a leading edge which advances in cork screw fashion through the wall of the plastic clay pipe and severs a clay plug therefrom as the drill is rotated in the direction of said point and advanced axially therethrough, said spur confining the severed plug within the semi-cylindrical shank, thereby to withdraw the plug as the drill is retracted from the said wall.

References Cited in the file of this patent
UNITED STATES PATENTS

| | | |
|---|---|---|
| 806,333 | Folden | Dec. 5, 1905 |
| 888,921 | Murray et al. | May 26, 1908 |